US010530017B2

(12) United States Patent
Kamikawa et al.

(10) Patent No.: US 10,530,017 B2
(45) Date of Patent: Jan. 7, 2020

(54) STORAGE-BATTERY CONTROL SYSTEM (71) Applicant: Panasonic Intellectual Property Management Co., Ltd., Osaka (JP)

(72) Inventors: Takahiro Kamikawa, Osaka (JP); Takayuki Mino, Chiba (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 383 days.

(21) Appl. No.: 15/504,226

(22) PCT Filed: Jan. 8, 2016

(86) PCT No.: PCT/JP2016/000070
§ 371 (c)(1),
(2) Date: Feb. 15, 2017

(87) PCT Pub. No.: WO2016/114115
PCT Pub. Date: Jul. 21, 2016

(65) Prior Publication Data
US 2017/0279161 A1 Sep. 28, 2017

(30) Foreign Application Priority Data
Jan. 16, 2015 (JP) .................................. 2015-006797

(51) Int. Cl.
*H01M 10/42* (2006.01)
*H01M 2/10* (2006.01)
(Continued)

(52) U.S. Cl.
CPC ....... *H01M 10/425* (2013.01); *H01M 2/1016* (2013.01); *H01M 2/1077* (2013.01);
(Continued)

(58) Field of Classification Search
CPC ............. H01M 10/425; H01M 10/482; H01M 2010/4271; H01M 2010/4278;
(Continued)

(56) References Cited

U.S. PATENT DOCUMENTS

2014/0266051 A1* 9/2014 Hayakawa ............ H02J 7/0016
320/118

FOREIGN PATENT DOCUMENTS

JP 2006-296034 10/2006
JP 2008-131670 6/2008
(Continued)

OTHER PUBLICATIONS

International Search Report of PCT application No. PCT/JP2016/000070 dated Mar. 22, 2016.

*Primary Examiner* — Lingwen R Zeng
(74) *Attorney, Agent, or Firm* — McDermott Will & Emery LLP (57) ABSTRACT In a storage-battery control system, an insulating communication unit couples a controller and a plurality of battery modules coupled together in series to configure a storage battery unit. A floating grounding pattern of the controller is divided into a first floating grounding pattern and a second floating grounding pattern. The plurality of battery modules in the storage battery unit is divided into a first zone battery module group and a second zone battery module group so that the battery modules belonging to the first zone battery module group correspond to the first floating grounding pattern, while the battery modules belonging to the second zone battery module group correspond to the second floating grounding pattern. An insulating communication unit couples the respective battery modules.

4 Claims, 4 Drawing Sheets (51) Int. Cl.
*H01M 2/20* (2006.01)
*H01M 10/48* (2006.01)
*H02J 7/00* (2006.01)

(52) U.S. Cl.
CPC ......... *H01M 2/206* (2013.01); *H01M 10/482* (2013.01); *H02J 7/0021* (2013.01); *H01M 2010/4271* (2013.01); *H01M 2010/4278* (2013.01)

(58) Field of Classification Search
CPC .. H01M 2/1016; H01M 2/1077; H01M 2/206; H02J 7/0021
See application file for complete search history.

(56) References Cited

FOREIGN PATENT DOCUMENTS

| | | |
|---|---|---|
| JP | 2009-178351 | 8/2009 |
| JP | 2010-142039 | 6/2010 |

* cited by examiner

STORAGE-BATTERY CONTROL SYSTEM

CROSS-REFERENCE TO RELATED APPLICATIONS

This application is a U.S. national stage application of the PCT International Application No. PCT/JP2016/000070 filed on Jan. 8, 2016, which claims the benefit of foreign priority of Japanese patent application No. 2015-006797 filed on Jan. 16, 2015, the contents all of which are incorporated herein by reference.

TECHNICAL FIELD

The present invention relates to a storage-battery control system.

BACKGROUND ART

To provide a storage battery having a larger capacity and outputting a higher voltage, a plurality of battery modules is coupled in series and in parallel.

PTL 1 points out that, when a single central microprocessor is used to monitor all voltage values of a plurality of batteries coupled in series to configure a battery module, an analog level shift circuit is required for converting a voltage difference between a reference potential point for a voltage detection IC provided for each battery and a grounding reference point for the central microprocessor, so that the more batteries increase in number, the more consumption power increases.

To solve this problem, PTL 1 describes that an individual detection module having a function for detecting a voltage value and a function of a microprocessor is provided for each battery, and each individual module is coupled to the central microprocessor via an isolator.

CITATION LIST

Patent Literature

PTL 1: Unexamined Japanese Patent Publication No. 2008-131670

SUMMARY OF THE INVENTION

An object of the present invention is to use a general-purpose insulating circuit at low cost to achieve a high-voltage storage battery.

A storage-battery control system according to the present invention includes a plurality of battery modules coupled together in series to configure a storage battery unit for outputting a predetermined high voltage value, a controller, and an insulating communication unit configured to couple the plurality of battery modules and the controller. Each of the plurality of battery modules includes a secondary battery for outputting a module voltage value, and a module-side insulating circuit having a floating reference potential point insulated from a module reference potential point for the secondary battery to couple the battery module and the insulating communication unit. The controller includes a low voltage power supply unit, and a controller-side insulating circuit having a floating reference potential point insulated from a controller reference potential point for the low voltage power supply unit to couple the controller and the insulating communication unit. A floating grounding pattern including a floating reference battery point for the controller is divided into a plurality of floating grounding patterns in correspondence to a zone division number determined based on a number obtained by dividing a high voltage value output from the storage battery unit with an insulation withstand voltage value for the module-side insulating circuit. A total of the plurality of battery modules is divided into a plurality of zone battery module groups in correspondence to the zone division number. The plurality of zone battery module groups is coupled with the insulating communication unit so as to correspond to the plurality of floating grounding patterns that is different from each other.

According to the storage-battery control system configured as described above, when a high voltage value output from the storage battery unit possibly exceeds a withstanding voltage value of the insulating circuit, the battery modules are divided into a plurality of zone battery module groups to use floating grounding patterns that differ for the respective battery modules. Thus, a cost effective, general-purpose insulating circuit having a lower insulation withstand voltage value can be used.

DESCRIPTION OF EMBODIMENT

Hereinafter, an exemplary embodiment according to the present invention will be described in detail with reference to the drawings. A lithium ion battery is described as a secondary battery configuring a battery module. However, another secondary battery may be used. For example, a nickel hydride battery, a nickel cadmium battery, or another battery may be used. A storage battery unit and a battery module are advantageous for obtaining voltage and current values corresponding to electric power required for a load. Thus, the number of battery modules configuring a storage battery unit, the number of battery cells included in each of secondary batteries configuring the battery modules, and the like may be changed as appropriate depending on specifications of a storage-battery control system. Voltage values and the like described below are merely examples. Such values may be changed as appropriate depending on electric power specifications and the like of a storage-battery control system.

In the following, similar components in all the drawings are denoted by identical reference numerals so as to omit duplicated description. The reference numerals will sometimes be used again as required in subsequent description.

Figure 1:
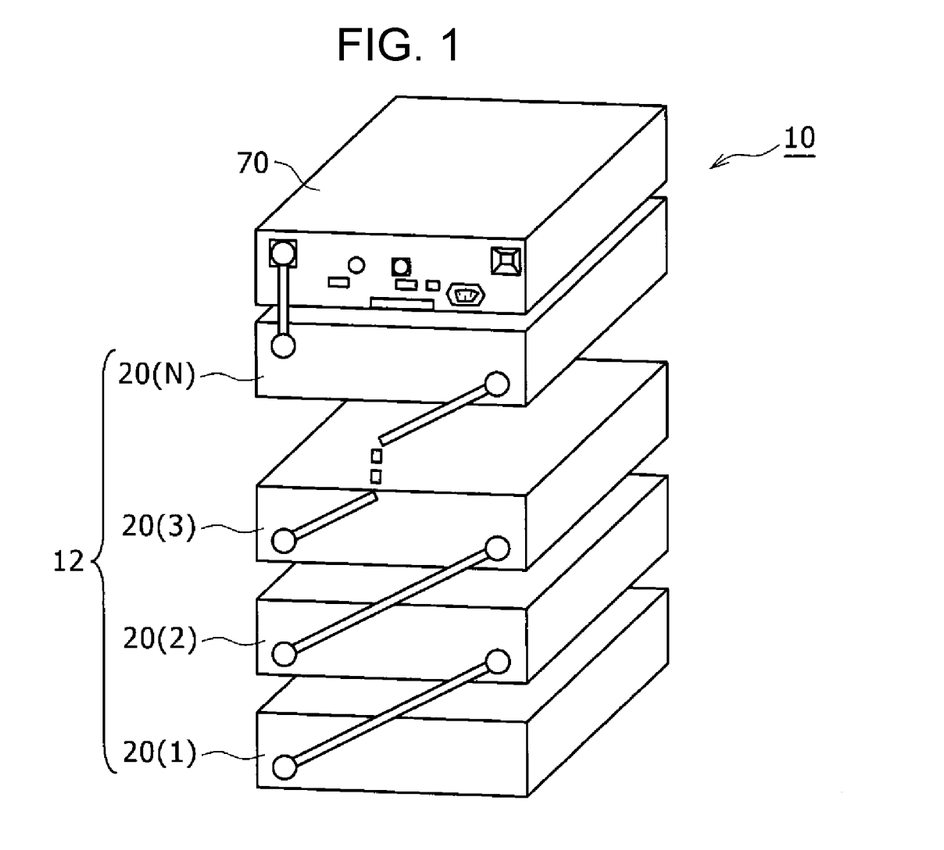
FIG. 1 is an external view of a storage-battery control system according to the present invention.

FIG. 1 is a view illustrating a configuration of storage-battery control system 10. Storage-battery control system 10 is a system including storage battery unit 12 combined with a plurality of battery modules 20, and controller 70 for appropriately controlling charging and discharging of storage battery unit 12.

Storage battery unit 12 includes a predetermined number of battery modules 20 coupled in series. In FIG. 1, the predetermined number is set to N, and the number of N of battery modules 20 are stacked in a vertical direction from a bottom to a top when viewed from front, thereby configuring storage battery unit 12 as a stacked body of battery modules 20. To distinguish each of the number of N of battery modules 20, the numbers are specified as battery module 20(1), 20(2), ..., 20(N), from a low voltage side at the bottom to a high voltage side at the top of the stacked body. One controller 70 is provided for each storage battery unit 12. That is, in FIG. 1, one controller 70 is provided for each of a number of N of battery modules 20.

For example, when a module voltage value, i.e., a voltage value across terminals of one battery module 20, is 40 V, and N=20, a voltage value across terminals of storage battery unit 12 is 20·40 V=800 V. This example will now be described herein. However, this is merely an example, and a module voltage value may be another value other than 40 V while N may be another value other than 20.

Figure 2:
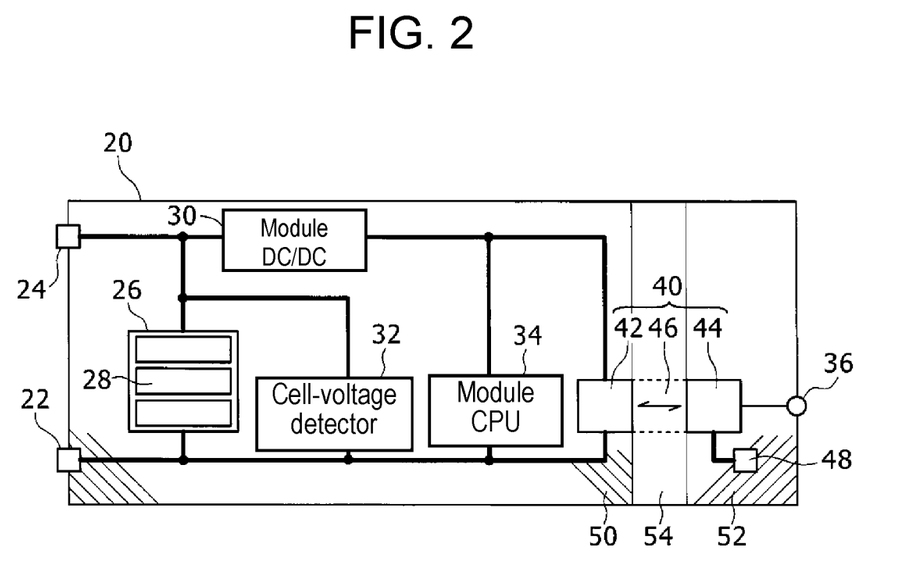
FIG. 2 is a configuration diagram of a battery module used in the storage-battery control system according to the present invention.

FIG. 2 is a configuration diagram of one battery module 20. Battery module 20 includes input terminal 22 supplied with electric power output from output terminal (24) of next lower battery module 20 at the lower voltage side, output terminal 24 for supplying output power having a module voltage value that is 40 V higher than a voltage value at input terminal 22 to input terminal (22) of next higher battery module 20 at the higher voltage side, and signal terminal 36 for communicating with controller 70.

Battery module 20 includes secondary battery 26 for outputting a module voltage value, module DC/DC 30, cell-voltage detector 32 for detecting a voltage value of secondary battery 26 and the like, module CPU 34 for controlling signals for battery module 20 internally, and module-side insulating circuit 40.

These elements are disposed on a module circuit board. The module circuit board includes high voltage grounding pattern 50 having a module reference potential point regarding a module voltage value, and floating grounding pattern 52 having a floating reference potential point insulated from the module reference potential point. Both the grounding patterns are electrically insulated each other via insulating region 54. Module-side insulating circuit 40 is disposed across these two grounding patterns. Module-side insulating circuit 40 will be described later. The module reference potential point is input terminal 22. The floating reference potential point is grounding terminal 48 at a portion of module-side insulating circuit 40, the portion being disposed on floating grounding pattern 52.

Secondary battery 26 is configured to couple in series a plurality of battery cells 28. An example in FIG. 2 shows a configuration of one secondary battery 26 in which three battery cells 28 are coupled in series. One battery cell 28 has a voltage value across terminals of (40 V/3)=13.3 V. In one battery cell 28, a plurality of unit batteries is coupled in series and in parallel to output predetermined voltage and current values. As a unit battery, a lithium ion battery having a terminal voltage value in a range from 1 V to 4 V inclusive may be used.

Module DC/DC 30 is a module-side voltage converter that partially uses electric power of secondary battery 26 to supply required electric power to electronic components and other components in battery module 20. Module DC/DC 30 is a voltage converter for converting a voltage value across terminals of secondary battery 26 of 40 V into an operation voltage value of 5 V, for example. An input terminal of module DC/DC 30 is coupled to a positive electrode terminal of secondary battery 26, while an output terminal is coupled to power source terminals of module CPU 34 and module-side insulating circuit 40.

Cell-voltage detector 32 is a sensor for detecting a voltage value across terminals of secondary battery 26, for example. Cell-voltage detector 32 may further detect a battery cell voltage value, i.e., a voltage value across terminals of each battery cell 28. Cell-voltage detector 32 has a function of detecting the battery states, such as a current value and a battery cell temperature, in addition to a voltage value. However, cell-voltage detector 32 herein typically detects a battery cell voltage value. A detected battery cell voltage value and other values are sent to controller 70 via module CPU 34, module-side insulating circuit 40, and signal terminal 36.

Module CPU 34 is a module-side controlling circuit for controlling signals for battery module 20 internally. A signal control includes converting a battery cell voltage value and other values sent from cell-voltage detector 32 into values appropriate for processing in controller 70, and obtaining an state of charge (SOC) indicating a state of charge in secondary battery 26.

Module-side insulating circuit 40 is a transmitting circuit for transmitting data output from module CPU 34 to controller 70. The reason why module-side insulating circuit 40 is provided is a difference between a module grounding potential, i.e., a reference potential for battery module 20 and a controller grounding potential, i.e., a reference potential for controller 70.

Module-side insulating circuit 40 includes primary circuit unit 42 that lies on high voltage grounding pattern 50, secondary circuit unit 44 that lies on floating grounding pattern 52, and insulating band 46 disposed between primary circuit unit 42 and secondary circuit unit 44. Examples of widely known insulating circuit types include a magnetic coupling type using a transformer, a capacitance coupling type using two opposing electrodes, and an optical coupling type using a photo-coupler. A bidirectional photo-coupler type is used herein as module-side insulating circuit 40. A bidirectional photo-coupler is capable of an outward transmission to transmit from battery module 20, and a return reception to receive at battery module 20, and includes two photo-couplers. That is, primary circuit unit 42 is provided with an outward transmission LED and a return reception photodiode, while secondary circuit unit 44 is provided with an outward reception photodiode and a return transmission LED. Insulating band 46 is a separated space or a member made of a light pervious resin.

Electronic type module-side insulating circuit 40 using a photo-coupler uses a general-purpose optical communication insulating circuit that is commercially available. A insulation withstand voltage value required between primary circuit unit 42 and secondary circuit unit 44 in module-side insulating circuit 40 will now be discussed herein.

A grounding terminal of primary circuit unit 42 in module-side insulating circuit 40 is coupled to input terminal 22, i.e., the module reference potential point, via high voltage grounding pattern 50. A voltage value at input terminal 22 differs depending on the number of N of battery modules represented as battery module 20(N). When N=1, a voltage value at input terminal 22 is 0 V, i.e., a grounding potential of storage-battery control system 10. When N=2, the voltage value is 40 V. When N=3, the voltage value is (2×40 V)=80 V. As N increases, the voltage value at input terminal 22 increases. When N=20, the voltage value reaches (19×40 V)=760 V. On the other hand, a voltage value at grounding terminal 48 of secondary circuit unit 44 in module-side insulating circuit 40 is equivalent to a floating grounding potential of floating grounding pattern 52, and the voltage value does not take any particular value. Its minimum voltage value should be a voltage value of 0 V at input terminal 22 of battery module 20(1) for a safety reason.

A insulation withstand voltage value required for module-side insulating circuit 40 in each battery module 20(N) should therefore be [{(N−1)×40 V}−0 V]. When module-side insulating circuits 40 are all identical in terms of specifications, a insulation withstand voltage value of 760 V is required for module-side insulating circuits 40. A insulation withstand voltage value specified in general-purpose photo-coupler type optical communication insulating circuits that are commercially available is approximately 400 V or lower. To obtain a insulation withstand voltage value of 760 V, special specifications including extended insulating band 46, and a correspondingly increased amount of light or improved light sensitivity are required for such an insulating circuit. However, such special specifications could increase an insulating circuit in size, and require further development time and cost.

Figure 3:
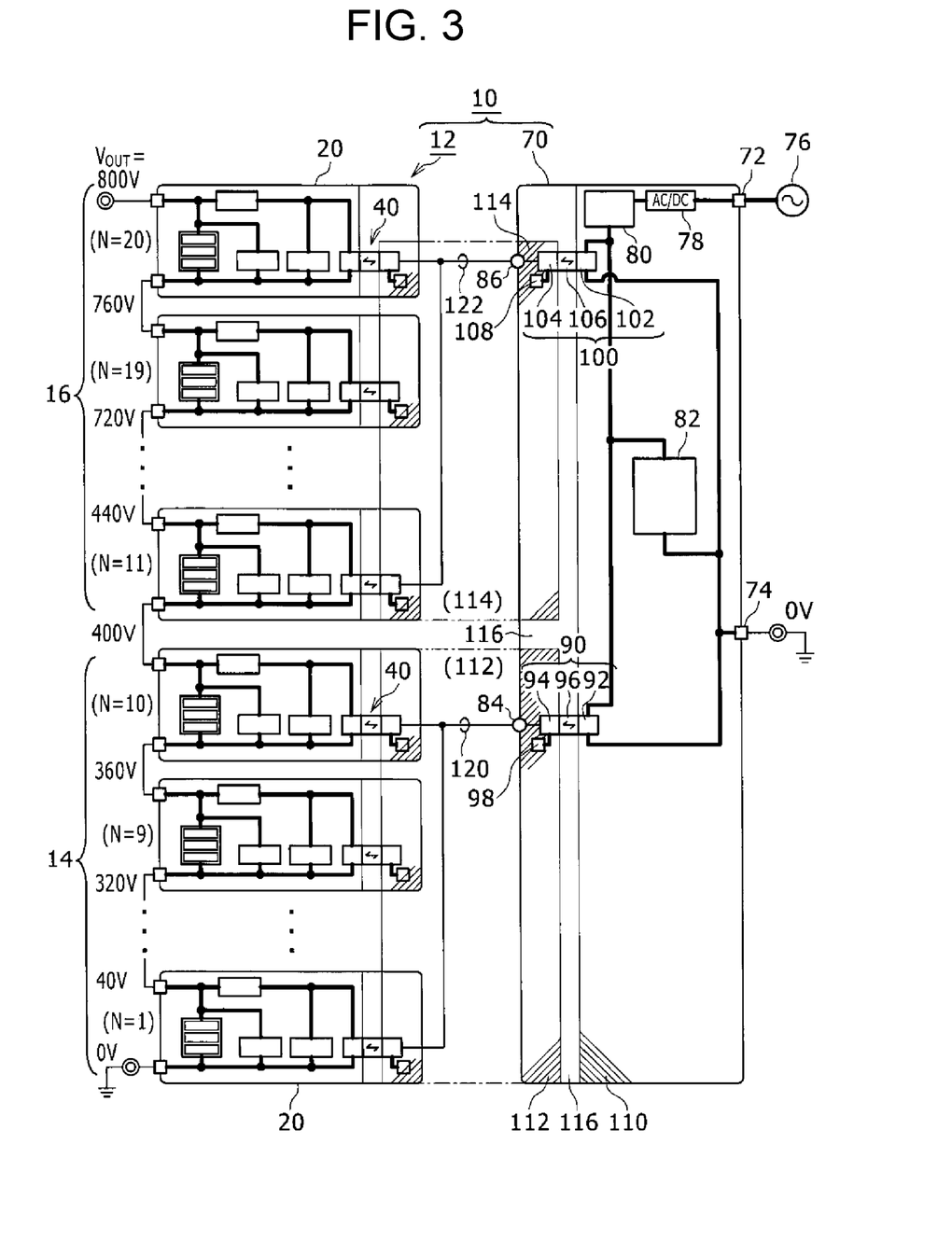
FIG. 3 is a configuration diagram of the storage-battery control system according to the present invention.

FIG. 3 is a view illustrating a configuration of storage-battery control system 10 that uses a commercially available, general-purpose optical communication insulating circuit as module-side insulating circuit 40. To exemplify a coupling state of 20 battery modules 20 configuring storage battery unit 12, battery modules 20 identified by N=1, 9, 10, 11, 19, and 20, and voltage values at respective input terminals 22 and output terminals 24 are illustrated.

Controller 70 is a controlling circuit for controlling charging and discharging of storage battery unit 12. Controller 70 includes power source terminal 72 coupled to external commercial power supply 76, grounding terminal 74 coupled to a point having a grounding potential of 0 V on storage-battery control system 10, signal terminals 84, 86 communicating with storage battery unit 12.

Controller 70 includes an AC/DC power converter indicated as AC/DC, controller DC/DC 80, controller CPU 82, and controller-side insulating circuits 90, 100.

AC/DC power converter 78 is a low voltage power supply unit for converting AC power supplied from external commercial power supply 76 into DC power at a predetermined DC voltage value. Controller DC/DC 80 is a voltage converting circuit for converting a DC voltage value of DC power output from AC/DC power converter 78 into an operation voltage value for controller CPU 82 and controller-side insulating circuits 90, 100. If an operation voltage value of controller CPU 82 differs from an operation voltage value of controller-side insulating circuits 90, 100, for example, DC power output from AC/DC power converter 78 may be supplied to controller-side insulating circuits 90, 100, while DC power output from controller DC/DC 80 may be supplied to controller CPU 82. Controller CPU 82 is a controlling circuit for controlling signals in controller 70 internally to provide necessary control instructions to battery modules 20 configuring storage battery unit 12.

These elements are disposed on a controller circuit board. The controller circuit board includes low voltage grounding pattern 110 having a controller reference potential point for controller CPU 82, and first floating grounding pattern 112 and second floating grounding pattern 114 respectively corresponding to two floating reference potential points insulated from a controller low voltage reference potential point. These grounding patterns are electrically insulated each other by insulating region 116. Controller-side insulating circuit 90 is disposed across low voltage grounding pattern 110 and first floating grounding pattern 112, while controller-side insulating circuit 100 is disposed across low voltage grounding pattern 110 and second floating grounding pattern 114.

Controller-side insulating circuit 90 includes primary circuit unit 92 that lies on low voltage grounding pattern 110, secondary circuit unit 94 that lies on first floating grounding pattern 112, and insulating band 96 disposed between primary circuit unit 92 and secondary circuit unit 94. Similarly, controller-side insulating circuit 100 includes primary circuit unit 102 that lies on low voltage grounding pattern 110, secondary circuit unit 104 that lies on second floating grounding pattern 114, and insulating band 106 disposed between primary circuit unit 102 and secondary circuit unit 104. Similarly to module-side insulating circuit 40 described in FIG. 2, controller-side insulating circuit 90 and controller-side insulating circuit 100 use a general-purpose bidirectional photo-coupler type optical communication insulating circuit that is commercially available.

A controller reference potential point is grounding terminal 74. The first floating reference potential point, i.e., a reference potential point on first floating grounding pattern 112, is grounding terminal 98 at a portion of controller-side insulating circuit 90 which is disposed on first floating grounding pattern 112. The second floating reference potential point, i.e., a reference potential point on second floating grounding pattern 114, is grounding terminal 108 at a portion of controller-side insulating circuit 100 which is disposed on second floating grounding pattern 114.

As shown in FIG. 3, the reason why first floating grounding pattern 112 and second floating grounding pattern 114, which are separated each other and are respectively provided with controller-side insulating circuits 90, 100, are provided in controller 70 is to prevent the minimum floating grounding potential value of each battery module 20 in storage battery unit 12 from dropping to 0 V that is a voltage value at input terminal 22 of battery module 20(1).

That is, a number of 2 obtained by dividing a voltage value of 800 V output from storage battery unit 12 with a insulation withstand voltage value of 400 V of module-side insulating circuit 40 when a commercially available, general-purpose optical communication insulating circuit is used is specified as a zone division number to divide, in response to the zone division number of 2, a floating grounding pattern into two floating grounding patterns. Storage battery unit 12 is then divided into two zone battery module groups each configured by 10 battery modules 20, a number of which is obtained when the total of 20 of battery modules is divided with the zone division number of 2.

In the example shown in FIG. 3, 10 battery modules 20 identified by N=1 to N=10 are included in first zone battery module group 14, while other 10 battery modules 20 identified by N=11 to N=20 are included in second zone battery module group 16. A floating grounding potential for battery modules 20 identified by N=1 to N=10 configuring first zone battery module group 14 is adjusted to a first floating grounding potential of controller 70, while a floating grounding potential for battery modules 20 identified by N=11 to N=20 configuring second zone battery module group 16 is adjusted to a second floating grounding potential of controller 70.

An output of secondary circuit unit 94 in controller-side insulating circuit 90 is coupled by insulating communication unit 120, via signal terminal 84, to signal terminal 36 of module-side insulating circuit 40 in each battery module 20 configuring first zone battery module group 14. In FIG. 3, signal terminal 36 of module-side insulating circuit 40 in battery module 20 identified by N=1, and signal terminal 36 of module-side insulating circuit 40 in battery module 20 identified by N=10 are representatively coupled to insulating communication unit 120.

Similarly, an output of secondary circuit unit 104 in controller-side insulating circuit 100 is coupled by insulating communication unit 122, via signal terminal 86, to signal terminal 36 of module-side insulating circuit 40 in each battery module 20 configuring second zone battery module group 16. In FIG. 3, signal terminal 36 of module-side insulating circuit 40 in battery module 20 identified by N=11, and signal terminal 36 of module-side insulating circuit 40 in battery module 20 identified by N=20 are representatively coupled to insulating communication unit 122.

According to this configuration, the minimum floating grounding potential value of 10 battery modules 20 identified by N=11 to N=20 configuring a second zone battery module becomes 400 V, which is a voltage value at input terminal 22 of battery module 20(11). Accordingly, in module-side insulating circuit 40 in battery module 20 identified by N=20, which requires the highest insulation withstand voltage value in 10 battery modules 20 identified by N=11 to N=20 configuring the second zone battery module, a required insulation withstand voltage value becomes (760 V−400 V)=360 V.

The minimum floating grounding potential value of 10 battery modules 20 identified by N=1 to N=10 configuring a first zone battery module is 0 V, which is a voltage value at input terminal 22 of battery module 20(1). Accordingly, in module-side insulating circuit 40 in battery module 20 identified by N=10, which requires the highest insulation withstand voltage value in 10 battery modules 20 identified by N=1 to N=10 configuring the first zone battery module, a required insulation withstand voltage value becomes (360 V−0 V)=360 V.

By dividing the floating grounding pattern of controller 70 into two patterns, and allocating first zone battery module group 14 and second zone battery module group 16 to the two divided patterns, respectively, a insulation withstand voltage value required for module-side insulating circuit 40, and controller-side insulating circuits 90, 100 can be maintained to 400 V or lower. For all of module-side insulating circuit 40 and controller-side insulating circuits 90, 100, commercially available, general-purpose bidirectional photo-coupler type optical communication insulating circuits can therefore be used.

In the above description, the voltage value of 800 V output from storage battery unit 12 is divided by the insulation withstand voltage value of 400 V to obtain the division number of 2. A floating grounding pattern may generally be divided into a plurality of floating grounding patterns in response to a zone division number determined based on a number obtained by dividing a high voltage value output from storage battery unit 12 with a insulation withstand voltage value of module-side insulating circuit 40. For example, when storage battery unit 12 outputs a high voltage value of 900 V, a division number can be 3. When a commercially available, general-purpose bidirectional photo-coupler type optical communication insulating circuit to be used has a insulation withstand voltage value of 300 V, a division number can be 3 based on a calculation of 800 V/300 V=2.67.

Figure 4:
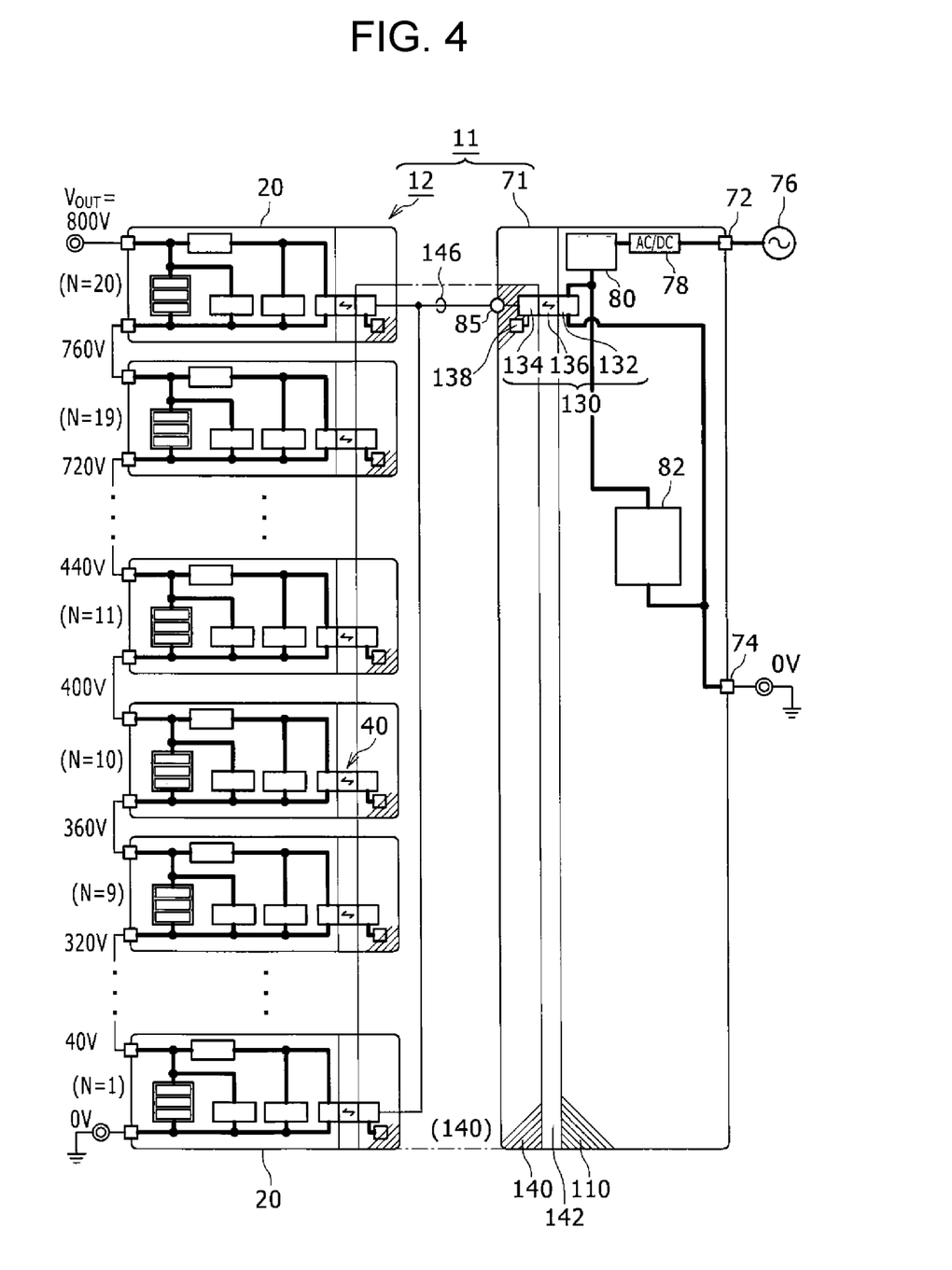
FIG. 4 is a configuration diagram of a storage-battery control system with a single floating grounding pattern, illustrated as a comparative example.

FIG. 4 is a configuration diagram of storage-battery control system 11 with a single floating grounding pattern, illustrated as a comparative example. Controller 71 in here includes one floating grounding pattern 140 insulated by insulating region 142 from low voltage grounding pattern 110, and uses one controller-side insulating circuit 130. Controller-side insulating circuit 130 includes primary circuit unit 132 that lies on low voltage grounding pattern 110, secondary circuit unit 134 that lies on floating grounding pattern 140, and insulating band 136 disposed between primary circuit unit 132 and secondary circuit unit 134. A floating reference potential point, i.e. a reference potential point on floating grounding pattern 140, is grounding terminal 138 at a portion of controller-side insulating circuit 130, which is disposed on floating grounding pattern 140.

An output of secondary circuit unit 134 in controller-side insulating circuit 130 is coupled by insulating communication unit 146, via signal terminal 85, to signal terminal 36 of module-side insulating circuit 40 in each battery module 20 configuring storage battery unit 12. In FIG. 4, signal terminal 36 of module-side insulating circuit 40 in battery module 20 identified by N=1, and signal terminal 36 of module-side insulating circuit 40 in battery module 20 identified by N=20 are representatively coupled to insulating communication unit 146.

Since controller 71 has one floating grounding pattern 140 in storage-battery control system 11 shown in FIG. 4, the minimum floating grounding potential value of each battery module 20 in storage battery unit 12 becomes 0 V that is a voltage value at input terminal 22 of battery module 20(1). Accordingly, in module-side insulating circuit 40 in battery module 20 identified by N=20, which requires the highest insulation withstand voltage value in 20 battery modules 20 identified by N=1 to N=20 configuring storage battery unit 12, a required insulation withstand voltage value becomes (760 V−0 V)=760 V.

A insulation withstand voltage value specified in commercially available, general-purpose, photo-coupler type optical communication insulating circuits is approximately 400 V or lower. To obtain a insulation withstand voltage value of 760 V, special specifications including extended insulating band 46, and an correspondingly increased amount of light or improved light sensitivity are required for module-side insulating circuit 40. However, such special specifications could increase module-side insulating circuit 40 in size, as well as correspondingly increase battery module 20 in size, and require further development time and cost.

According to storage-battery control system 10 configured as shown in FIGS. 1 to 3, the problems found in storage-battery control system 11 shown in FIG. 4 can be solved, and a cost effective, general-purpose insulating circuit can be used for providing a high-voltage storage battery.

The invention claimed is:
1. A storage-battery control system comprising:
a plurality of battery modules coupled together in series to configure a storage battery unit for outputting a predetermined high voltage value;
a controller; and
insulating communication units each configured to couple the plurality of battery modules and the controller,
wherein each of the plurality of battery modules includes a secondary battery for outputting a module voltage value, and a module-side insulating circuit having a floating reference potential point insulated from a module reference potential point for the secondary battery to couple the battery module and one of the insulating communication units,
the controller includes a low voltage power supply unit, and a controller-side insulating circuit having a floating reference potential point insulated from a controller reference potential point for the low voltage power supply unit to couple the controller and the insulating communication units, a floating grounding pattern including the floating reference potential point for the controller is divided into a plurality of floating grounding patterns in correspondence to a zone division number determined based on a number obtained by dividing the predetermined high voltage value output from the storage battery unit by an insulation withstand voltage value for the module-side insulating circuit, a total of the plurality of battery modules is divided into a plurality of zone battery module groups in correspondence to the zone division number, and the plurality of zone battery module groups is coupled with the insulating communication units so as to correspond to the plurality of floating grounding patterns that is different from each other.

2. The storage-battery control system according to claim 1, wherein an insulation withstand voltage value of a general-purpose optical communication insulating circuit is used as the insulation withstand voltage value for the module-side insulating circuit.

3. The storage-battery control system according to claim 1, wherein the module-side insulating circuit and the controller-side insulating circuit are photo-coupler type bidirectional optical communication insulating circuits.

4. The storage-battery control system according to claim 2, wherein the module-side insulating circuit and the controller-side insulating circuit are photo-coupler type bidirectional optical communication insulating circuits.

* * * * *